United States Patent Office 3,405,228
Patented Oct. 8, 1968

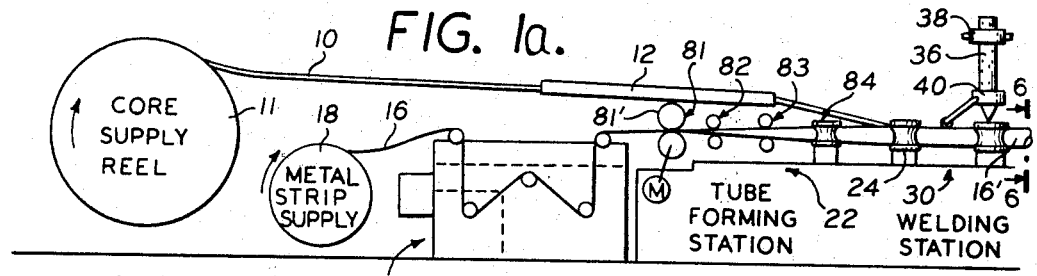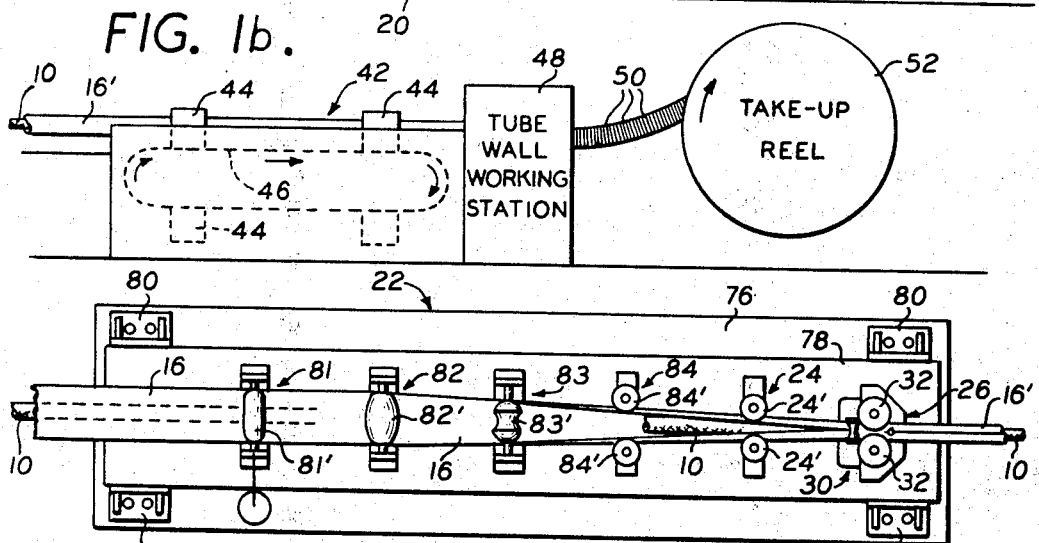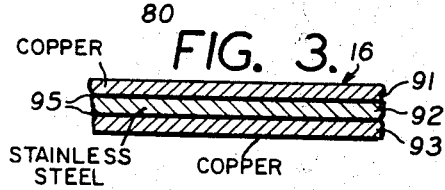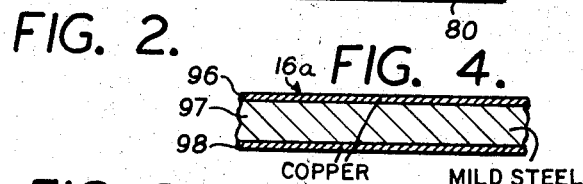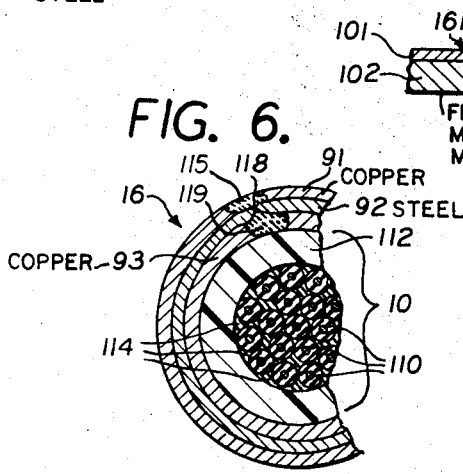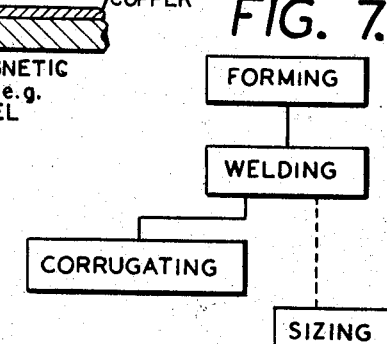
INVENTOR
FRED F. POLIZZANO
BY
Sandoe, Neill, Schottler & Wikstrom
ATTORNEYS.

3,405,228
FOLDED, LAMINATED ELECTRICAL CABLE
SHEATH HAVING ABUTTING EDGES OF
ONE LAMINATION UNWELDED
Fred F. Polizzano, Allendale, N.J., assignor to General
Cable Corporation, New York, N.Y., a corporation of
New Jersey
Continuation-in-part of application Ser. No. 478,820,
Aug. 11, 1965. This application Nov. 29, 1967,
Ser. No. 686,670
11 Claims. (Cl. 174—106)

ABSTRACT OF THE DISCLOSURE

This specification discloses an improved construction for shielded electric cable that has a metallic sheath longitudinally wrapped around the cable with a butt seam which is welded. The sheath is laminated but instead of having the outer lamination wider than any inner lamination, so that the welded seam has no shielding under it, this invention has the outer welded lamination of higher electric conductivity and lower melting point than the underlying lamination, and has the underlying lamination extending under the entire area of the butt welded edge portions of the outer laminations. The preferred construction has copper as the outer lamination and a stainless steel as the inner lamination with only the copper welded.

Related patents or applications

This application is a continuation-in-part of Ser. No. 478,820, filed Aug. 11, 1965, now abandoned.

This invention is an improvement on the method and product disclosed in Jachimowicz No. 3,183,300. In that patent, a core of insulated cable is surrounded by a laminated metallic sheath having an outer lamination of steel and an inner lamination which is preferably aluminum. The sheath has a butt weld of the outer lamination, but the aluminum has edges that terminate a substantial distance back from the welded seam so that the aluminum can not contaminate the weld at the high temperature required for welding steel. The sheath is initially much larger in diameter than the cable core so as to space the weld from the insulation on the core.

Brief description of the invention

This invention is an electric cable with an improved welded sheath that combines in one sheath the properties of (1) being gas-tight; (2) having high electrical conductivity along its surface; (3) providing a ferro-magnetic shield; and (4) having high mechanical strength. The sheath can be made with either a cylindrical or with a generally circumferentially corrugated wall, depending upon the degree of flexibility necessary.

This invention uses a laminate for the sheath which was formerly used on cables of the type where the sheath has a lap seam which is unwelded and which is held closed and protected from moisture by an outer plastic jacket. With this invention, such a laminate is welded and its use in a welded sheath obtains new and unexpected advantages.

One of these advantages is that the outer laminate can be welded without welding the inner laminate, and since the outer laminate has a lower melting point than the inner laminate, the weld can be made at a temperature that does not heat the inner laminate to a degree which will make it contaminate the weld and the edge portions of the inner laminate can, therefore, extend under the entire area of the edge portions of the welded seam. It is not necessary to cut back the inner laminate as in the Jachimowicz patent (supra) and thus the welded seam is much stronger because the welded edges are reinforced by the adjacent inner lamination.

The preferred construction of the invention has an inner laminate or mild steel, stainless steel (magnetic type) or other ferro-magnetic metal and an outer laminate of copper or some other metal which is a better conductor of electricity than the ferro-magnetic material and which is highly resistant to destructive corrosion. The sheath can be made with three laminates, the outer and inner ones being copper and the middle laminate being ferro-magnetic metal sandwiched between the copper laminates.

The invention also provides an improved method of making an electric cable of the character indicated.

Other objects, features and advantages of the invention will appear or be pointed out as the description proceeds.

Brief description of the drawing

In the drawing, forming a part hereof, in which like reference characters indicate corresponding parts in all the views:

FIGURES 1a and 1b are diagrammatic showings of apparatus for making electric cable with a composite sheath in accordance with this invention;

FIGURE 2 is a greatly enlarged top plan view of the forming and welding apparatus shown in FIGURE 1a;

FIGURES 3–5 are greatly enlarged, fragmentary sectional views through different kinds of composite metal strip from which the sheath can be made;

FIGURE 6 is a greatly enlarged sectional view through the cable with the metallic sheath applied and welded, the section being taken along the section line 6—6 of FIGURE 1a; and FIGURE 7 is a flow diagram.

Description of the preferred embodiments

FIGURES 1a and 1b show apparatus for making an electric cable with a composite metal sheath. A preformed core 10 of assembled electrical conductors is unwound from a core supply reel 11 and is advanced across a supporting tray 12 to forming and welding apparatus. A composite metal strip 16 is unwound from a strip supply coil 18 and with the composite metal strip preferably in a transversely flat condition as it is passed through a degreasing tank 20.

Beyond the tank 20, the composite metal strip 16 passes through successive roll stands of forming apparatus 22; and the core 10 is fed into the forming tube as the core 10 and forming strip 16 advance in unison through the forming and welding apparatus.

In the forming apparatus, the longitudinal edges of the strip 16 are brought together to make a longitudinal butt seam, and this seam advances through a welding station 30. A roll pass 26, formed by two rolls 32 on opposite sides of the formed tube holds the tube or sheath with the seam edges together and the formed sheath is indicated by the reference character 16'.

At the welding station 30 there is an electrode 36 held in a support 38. This electrode has its lower end positioned over the seam of the sheath 16' and shielding gas is flowed over the region of the weld from a nozzle 40.

At least the outer lamination of composite metal of the sheath 16' is welded along the longitudinal seam and this welding will be explained more fully in connection with FIGURE 6. It is an advantage of the invention that it can be carried out so as to close the seam of the sheath by welding the metal having the lower melting point and the sheath is preferably formed by bending the strip transversely in a direction which locates the lower-melting-point metal on the outside of the sheath. Where the composite metal has three laminations, the inner lamination may also be a low-melting-point metal and the manner in which this is welded will be explained in connection with FIGURE 6.

After the sheath 16' has been welded by the electrode 36, the sheath, with the core 10 located within it, is advanced by an endless belt feeder 42 (FIGURE 1b), having clamp-type grippers 44 connected at spaced locations around an endless belt 46. The feeder 42 advances the sheath 16' to a corrugator 48. If a flexible sheath is required, the corrugator 48 is equipped to form generally circumferentially extending corrugations 50; and the cable with this flexible sheath is wrapped on a take-up reel 52.

If substantial flexibility is not required, then the corrugator is not used and the tube is sized through a die and the sized sheath is coiled for shipment in the same manner as conventional, uncorrugated tubing.

Since the corrugating of the sheath 16' reduces its axial length, the rate of feed of the core 10 is substantially slower than the rate of feed of the strip 16 when the forming and welding apparatus is used with corrugating rolls beyond the welding station. When the sheath is sized after welding, the diameter is ordinarily reduced to some extent and this elongates the sheath and makes it necessary to feed the core 10 to the forming and welding apparatus at a higher speed than the strip 16 is fed.

When the sheath is to be corrugated, the forming apparatus is used with the forming roll passes adjusted to produce a tube diameter in which the core fits somewhat loosely. When there is to be no corrugating of the sheath, the tube can be formed snugly around the core 10 but the heat applied in welding must be kept to a degree low enough to avoid damage to the insulation which is adjacent to the seam. This invention makes it possible to weld the sheath closed with substantially less heat than is required where steel edges are welded. The copper edges weld at lower temperature than steel and the underlying steel laminate serves as a heat sink for carrying away heat to protect the insulation from overheating when the sheath is formed snugly around the core before welding.

The composite metal strip 16 is passed through the degreasing tank 20 prior to forming and welding, this tank and its operation being similar to that described in my co-pending application Ser. No. 428,757, filed Jan. 28, 1965 for Electric Arc Welding of Aluminum. The tank is structurally similar to commercially available vapor degreasers and no further description of it is necessary for a complete understanding of this invention.

The roll stands of the forming apparatus are supported from a base 76 which supports a frame 78 connected to the base 76 by brackets 80. There are three roll stands 81, 82 and 83 with upper and lower rolls indicated by the same reference characters as the roll stands but with a prime appended. The rolls in these first three stands 81–83 are mounted for rotation about horizontal axes.

A fourth roll stand 84 has rolls 84' located on opposite sides of the forming strip 16 and these rolls 84' are supported on vertical axes and preferably with adjustment toward and from one another in accordance with conventional practice for tube-forming mills.

A last roll stands 24 of the forming apparatus has rolls 24' which bring the edges of the strip 16 closer together while the core 10 is fed into the forming tube or sheath at a location where the seam is still open wide enough to receive the core, as shown in FIGURE 2.

At the welding station 30, the strip 16 is fully formed by the time it passes through the roll pass 26; and at a location adjacent to this roll pass 26, the seam of the formed tube or sheath is welded, as previously explained.

FIGURE 3 shows the metal strip 16 in section. This strip includes an outer lamination 91, a middle lamination 92 and an inner lamination 93. These laminations are preferably bonded together over the areas of their confronting faces, as indicated by the heavy lines 95. The manufacture of such composite metal strip is well known and no description of it is necessary for a complete understanding of this invention.

The lamination 91 is preferably made of copper and the lamination 92 is made of stainless steel (magnetic type). The lamination 93 is also made of copper. In the construction shown in FIGURE 3, all of the laminations 91, 92 and 93 are of the same thickness.

FIGURE 4 shows a modified construction for the composite metal strip, indicated by the reference character 16a. This strip has a thin outer lamination 96, a thick middle lamination 97 and a thin inner lamination 98. These laminations can be made of the same kind of metal as in FIGURE 3 but the cost of the material can be substantially reduced by having the middle lamination 97 made of mild steel. The use of thin copper laminations 96 and 98 still further reduces the cost of the strip 16a and the mild steel of the middle lamination 97 is protected against corrosion by the copper laminations 96 and 98 on both sides of the mild steel lamination 17.

FIGURE 5 shows still another modification for the composite metal strip; the strip of FIGURE 5 being designated by the reference character 16b. In this construction there is an outer lamination 101 of copper and an inner lamination 102 of mild steel or other ferromagnetic material. In this construction, the copper lamination 101 comprises 25% of the thickness of the strip 16b; and the ferro-magnetic lamination 102 comprises 75% of the thickness of the strip.

It will be understood that the choice of laminations depends upon the service to which the cable will be put. If conditions require that the sheath have high electrical conductivity for substantial current, then it is necessary to have the copper, or other good electrical conductor, in a lamination of substantial thickness. If service conditions do not require a substantial cross section of copper, or if conditions are not highly corrosive, then the cost of sheathed cable can be reduced by making the copper or other highly conductive and corrosive-resistant lamination thin, as compared with the lamination which is made of ferrous metal.

FIGURE 6 shows the core 10 with a plurality of individually insulated metal conductors 110 located in an insulating jacket 112. Space between the insulated conductors 110 and between the outer ones of these conductors and the jacket 112, contains filler material 114, in accordance with conventional cable construction practice.

The sheath 16 has the outer lamination 91 welded at 115 but the seam between the edges of the middle lamination 92 are not welded and this unwelded seam is indicated by the reference character 118, in FIGURE 6. The inner lamination 93 is welded as indicated by the continuous section 119 under the seam 118. This condition arises from the fact that the copper of the laminations 91 and 93 has a much lower melting point (1860° F.) than the melting point of the steel lamination 92 (2600–2750° F.).

When welding heat is applied to weld the seam along the edges of the outer lamination 91, heat flows inward by conduction through the middle lamination 92 and into the inner lamination 93. This heating by conduction is sufficient to melt and weld the inner lamination 93 before the seam 118 in the middle laminate 92 becomes hot enough for welding. Since the welding of the laminations 91 and 93 completely encloses the middle lamination 92, it is not necessary that the seam 118 be welded unless the sheath is to be subject to service where mechanical strength would make it necessary to weld the seam 118. Where such is the case, the sheath can be made larger than the outside of the jacket 112 so that there is a clearance between the core 10 and the longitudinal seams of the sheath at the time of welding; and the sheath can be sized to bring it down snugly on the core after the weld is completed. For most purposes, such mechanical strength is not necessary.

When the core 10 is surrounded by a sheath having only two laminations, such as the construction shown in FIGURE 5, the welding of the edges of the copper lamination 102 is sufficient to make the sheath gas-tight and except for special services, the welding of the edges of the ferro-magnetic lamination 102 is not necessary. Dissipation of heat through the mass of the lamination 102 protects the jacket of the core from excessive heating during welding of the seam edges of the outer lamination 101.

FIGURE 7 is a flow diagram showing the successive steps of forming and welding the composite metal strip to form the sheath, and showing the third step of either corrugating or sizing the tube.

The preferred embodiment of the invention has been illustrated and described, but changes and modifications can be made and some features can be used in different combinations without departing from the invention as defined in the claims.

What is claimed is:

1. In an electrical cable of the class having a core which includes a conductor and electrical insulation surrounding the conductor, and having a composite metallic sheath folded longitudinally around the core with the edges of the sheath in abutting relation with one another along a longitudinal seam, the improvement which comprises
   (a) the sheath including metal laminations metallurgically bonded to one another,
   (b) said laminations being of substantially equal width and the edges of each lamination abutting one another along said seam,
   (c) the outer lamination having a higher electrical conductivity and lower melting point than the underlying metal lamination, and being of corrosion-resistant metal,
   (d) the abutting edges of the outer lamination being welded together to make the sheath waterproof, and
   (e) the abutting edges of the underlying lamination being immediately below the edges of the outer lamination and being unwelded to one another but being held together by the metallurgical bonding to the edge portions of the outer lamination, which edge portions are welded to one another.

2. The electric cable described in claim 1 characterized by the outer layer of metal being copper with its edges welded together along the butt seam and the layer of metal that is bonded to the copper being a ferro-magnetic metal.

3. The electric cable described in claim 2 characterized by the ferro-magnetic metal being a magnetic-type stainless steel.

4. The electric cable described in claim 1 characterized by the sheath being made of three laminations of metal including two laminations that are bonded to opposite sides of a middle sandwiched layer over the confronting faces of the laminations, said two laminations being more resistant to corrosion than is the sandwiched layer.

5. The electric cable described in claim 4 characterized by the sheath being a tube and the outer and innermost laminations having lower melting points than the sandwiched layer and each having its seam edges welded together along the butt seam of the tube to form continuous surfaces over the middle sandwiched layer.

6. The electric cable described in claim 1 characterized by an assembly including a plurality of insulated conductors within the sheath and having spaces between and around the insulated conductors filled with filler material, and a jacket of electrical insulation applied snugly around the insulated conductors and filler material and completely filling the space between said assembly and the inside surface of the inner lamination of the composite metal sheath.

7. The electric cable described in claim 1 characterized by the outer lamination being copper and the inner lamination being a ferro-magnetic metal and being substantially thinner than the copper lamination.

8. The electric cable described in claim 1 characterized by the outer lamination being copper and the inner lamination being a ferro-magnetic material and being substantially thicker than the copper lamination.

9. The method of making an electric cable with a protecting sheath that includes a composite strip having substantially co-extensive laminations surface metallurgically bonded to one another over their confronting surfaces, the strip having a layer of ferro-magnetic material and a layer of other metal that is a better conductor of electricity than is the ferro-magnetic material and that has a lower melting point, which method comprises advancing a continuous insulated conductor through a forming and welding station, feeding the composite strip to the forming and welding station in unison with the insulated conductor, forming the composite strip around the insulated conductor as a tube with a longitudinally extending seam having the seam edges of both layers in abutting relation with one another, applying heat to the seam in sufficient intensity to weld together the abutting edges of the outer metal strip which has the lower melting point, and limiting the temperature of welding by heating the metal to a temperature greater than the melting point of the outer strip and less than the melting point of the ferro-magnetic material.

10. The method described in claim 9 characterized by forming the composite strip with a diameter substantially equal to the outside diameter of the insulation within the sheath whereby the sheath, as it is formed, substantially touches the insulation around the entire circumference of the sheath including the abutting seam edges, forming the strip in a direction which locates on the outside of the tube a metal of the strip which has a lower melting point than the other, and welding the outer lower-melting-point metal to close the seam while limiting the heat to a degree which avoids welding of the edges of the inner lamination and damage to the insulation on the conductor within the sheath.

11. The method described in claim 9 characterized by feeding to the forming and welding station a composite metal strip which has three laminations, the inner and outer laminations being made of metal of lower melting point than the middle lamination, and welding the seam edges of the outer lamination by direct application of heat from outside the tube, and welding the seam edges of the inner lamination by conduction of heat through the middle lamination, the heat being limited to a temperature less than the melting point of the middle lamination.

References Cited

UNITED STATES PATENTS

| | | | |
|---|---|---|---|
| 2,576,163 | 11/1951 | Weston et al. | 174—36 X |
| 2,589,700 | 3/1952 | Johnstone | 174—106 |
| 3,050,834 | 8/1962 | Ulam | 29—196.3 |
| 3,165,828 | 1/1965 | Kennedy | 29—196.3 |
| 3,183,300 | 5/1965 | Jachimowicz et al. | 174—106 |
| 3,272,911 | 9/1966 | Rollins et al. | 174—106 |

FOREIGN PATENTS

| | | |
|---|---|---|
| 1,337,816 | 8/1963 | France. |

LEWIS H. MYERS, *Primary Examiner.*

A. T. GRIMLEY, *Assistant Examiner.*